(12) United States Patent
Chen et al.

(10) Patent No.: US 6,947,191 B2
(45) Date of Patent: Sep. 20, 2005

(54) ANGLE-ADJUSTING APPARATUS FOR A REFLECTION MIRROR IN A REAR-PROJECTION TV

(75) Inventors: Kuo-Wen Chen, Hsinchu (TW); Chih-Chung Kang, Hsinchu (TW)

(73) Assignee: Coretronic Corporation, HsinChu (TW)

( * ) Notice: Subject to any disclaimer, the term of this patent is extended or adjusted under 35 U.S.C. 154(b) by 345 days.

(21) Appl. No.: 10/127,411

(22) Filed: Apr. 23, 2002

(65) Prior Publication Data

US 2002/0186352 A1 Dec. 12, 2002

(30) Foreign Application Priority Data

Jun. 11, 2001 (TW) ..................................... 90209709 U

(51) Int. Cl.[7] .............................................. G02B 26/08
(52) U.S. Cl. ...................... 359/225; 359/223; 359/226; 359/872; 359/873; 359/875; 359/876; 359/881
(58) Field of Search ................................ 359/223–226, 359/390, 391, 838, 843, 871–877, 881; 353/98

(56) References Cited

U.S. PATENT DOCUMENTS

| | | | | | |
|---|---|---|---|---|---|
| 4,413,923 A | * | 11/1983 | Wright | ........................ | 404/11 |
| 4,655,548 A | * | 4/1987 | Jue | ............................. | 348/373 |
| 4,770,522 A | * | 9/1988 | Alten | .......................... | 359/873 |
| 5,514,940 A | * | 5/1996 | Okamoto | ..................... | 318/469 |
| 5,946,151 A | * | 8/1999 | Levko | ......................... | 359/872 |

* cited by examiner

Primary Examiner—Drew A. Dunn
Assistant Examiner—Joshua L. Pritchett
(74) Attorney, Agent, or Firm—Rabin & Berdo, PC

(57) ABSTRACT

An adjustment apparatus of a reflection mirror is disclosed, the apparatus comprising a holding base plate, an affixing block affixed on the holding base plate, at least one adjusting set, and a rotatable chassis affixed onto the affixing block, wherein the reflection mirror is affixed on the rotatable chassis. Moreover, the adjusting set comprises an adjusting screw and an adjusting spring. The adjusting screw is mounted onto the holding base plate and transpierces the holding base plate to fix an extending portion of the rotatable chassis. The adjusting spring associated with the adjusting screw supports an extending portion of the rotatable chassis to counterbalance the adjustments in the adjusting screw. When the adjusting screw is rotated in, the rotatable chassis rotates along a first direction and compresses the adjusting spring. When the adjusting screw is rotated out, the rotatable chassis rotates along an opposite direction to the first direction and stretches the adjusting spring.

8 Claims, 5 Drawing Sheets

ANGLE-ADJUSTING APPARATUS FOR A REFLECTION MIRROR IN A REAR-PROJECTION TV

This application incorporates by reference Taiwanese application Serial No. 90209709, filed on Jun. 11, 2001.

BACKGROUND OF THE INVENTION

1. Field of the Invention

This invention relates to an angle-adjusting apparatus, and more particularly, to an angle-adjusting apparatus for a reflection mirror in a rear-projection TV.

2. Description of Related Art

Rear-projection televisions are generally used for the purposes of displaying education programs and simulation training programs such as piloting an airplane or driving a car. As the quality of life and the standard of living improve, rear-projection color TVs become desirable appliances to consumers.

A rear-projection TV uses a projection apparatus located behind the screen and a reflection mirror to reflect the light from the projection apparatus and to form an image on the screen. Compared with a conventional TV of cathode ray tube (CRT) type, a rear-projection TV has the advantages of no radiation, large screen size, and connectivity to a computer or other video equipment for educational or entertainment purposes. It is believed that the rear-projection TV will play an essential role in the entertainment display market, and therefore. Manufacturers of rear-projection TVs have made efforts to improve the image qualities, such as color intensity, focusing clarity, image resolution, and contrast.

The reflection mirror is an essential component in the rear-projection TV. The reflection mirror must reflect the light emitted from the light projector at a proper reflection angle, so that the desired image is precisely projected onto the screen. A good angle-adjusting apparatus for the reflection mirror can improve the focusing clarity and the image resolution of the rear-projection television type. The conventional angle-adjusting apparatus is shown in FIG. 1A and FIG. 1B. The rotatable base plate 104 is attached to the holding base 102 by the adjusting screws 112a, 112b, 112c, and 112d. A soft grommet 110 is implemented between the rotatable base plate 104 and an affixing screw 106. The reflection mirror 108 is situated on the rotatable base plate 104, and has an X-axis and a Y-axis perpendicular to each other. As shown in FIG. 1A, the X-axis points in a direction perpendicular to the plane of the drawing sheet, and the Y-axis points in a direction parallel to the drawing sheet, wherein the point of intersection is above the soft grommet 110. Adjusting the angle of the reflection mirror 108 is achieved by adjusting the angles of the X-axis and the Y-axis. The reflection mirror 108 can be adjusted to rotate along the X-axis by simultaneously operating the adjusting screws 112a and 112b. Similarly, the reflection mirror 108 can be adjusted to rotate along the Y-axis by simultaneously operating the adjusting screws 112c and 112d. In addition, while the reflection mirror 108 is rotating, the center of rotation remains located within the soft grommet, but its exact location shifts slightly.

When one uses the conventional angle-adjusting apparatus to adjust the reflection mirror, it is inevitable to encounter the following drawbacks:

1. In the ideal situation, the reflection mirror rotates along the X-axis or the Y-axis when the angle adjustment of the reflection mirror 108 is performed. However, in practice, the rotation center of the reflection mirror 108 shifts within the soft grommet 110 during the angle-adjustment procedure. The rotation center is not fixed because the shape of the soft grommet 110 deforms according to the adjustments in the four adjusting screws. Thus, it becomes very difficult and time consuming to adjust the angle about the X-axis and the angle about the Y-axis. For example, if the user has adjusted for the proper angle along the X-axis and then starts to adjust the angle along the Y-axis, the adjusted angle along the X-axis would be changed due to the shift in the rotation center. Therefore, the user must adjust the angle along the X-axis again. However, the angle along the Y-axis is changed while adjusting the angle along the X-axis. As a result, the user has to repeatedly adjust the angles along the X-axis and the Y-axis separately before the proper angles can be properly set.

2. It is easy to cause distortion and deformation of the reflection mirror if the user has insufficient skill to correctly adjust the angle of the mirror. When the user adjusts the angle along the Y-axis, the user has to rotate both adjusting screws 112a and 112b. For example, the adjusting screw 112a is turned in and the adjusting screw 112b is turned out simultaneously. In addition, the user must have sufficient skill to make the adjustment properly because the amount of adjustment for the adjusting screw 112a must be equal the amount of adjustment for the adjusting screw 112b. Otherwise, the reflection mirror 108 would be distorted or deformed. If the reflection mirror is distorted or deformed, it will cause the misalignment of the image pixel, resulting in a deformed image and poor resolution. This problem can severely affect the image quality of the rear-projection TV type. In addition, the conventional angle-adjustment apparatus, as shown in FIG. 1, is difficult to operate, and thus, making micro adjustments becomes even more difficult. This is inconvenient to the user.

SUMMARY OF THE INVENTION

It is therefore an objective of the present invention to provide an adjusting apparatus for the reflection mirror capable of micro adjustments, and without deformation of the mirror so that the image quality is maintained. In addition, the user can easily operate the adjusting apparatus of the present invention.

In accordance with the foregoing objectives, an adjustment apparatus of the reflection mirror is disclosed, and the said apparatus comprises a holding base plate, an affixing block affixed onto the holding base plate, at least one adjusting set, and a rotatable chassis affixed onto the affixing block, wherein a reflection mirror is affixed on the rotatable chassis. Moreover, the adjusting set comprises an adjusting screw and an adjusting spring. The adjusting screw is mounted onto the holding base plate and transpierces the holding base plate to fix an extending portion of the rotatable chassis. The adjusting spring associated with the adjusting screw supports an extending portion of the rotatable chassis to counterbalance the adjustments in the adjusting screw. When the adjusting screw is rotated in, the rotatable chassis rotates along a first direction and compresses the adjusting spring. When the adjusting screw is rotated out, the rotatable chassis rotates along a direction opposite to the first direction and stretches the adjusting spring.

BRIEF DESCRIPTION OF DRAWINGS

The invention can be more fully understood by reading the following detailed description of the preferred embodiments, with reference made to the accompanying drawings, wherein:

FIG. 1b illustrates a bottom view of the conventional adjusting apparatus of the reflection mirror shown in FIG. 1a;

DETAILED DESCRIPTION OF PREFERRED EMBODIMENTS

The apparatus of the present invention utilizes the adjusting screw and the adjusting spring coupled with each other to solve the issues of deformation of the reflection mirror and difficult operation associated with the conventional apparatus. Moreover, the reflection mirror of the invention is affixed to a rotatable chassis made of a hard metal, so as to prevent deformation of the reflection mirror during the adjustment procedure. The rotatable chassis is designed to have a hemisphere on top, whereby the rotation center can be effectively fixed, in order to achieve the easy adjustment of the reflection mirror and maintain the image resolution.

Figure 1A:
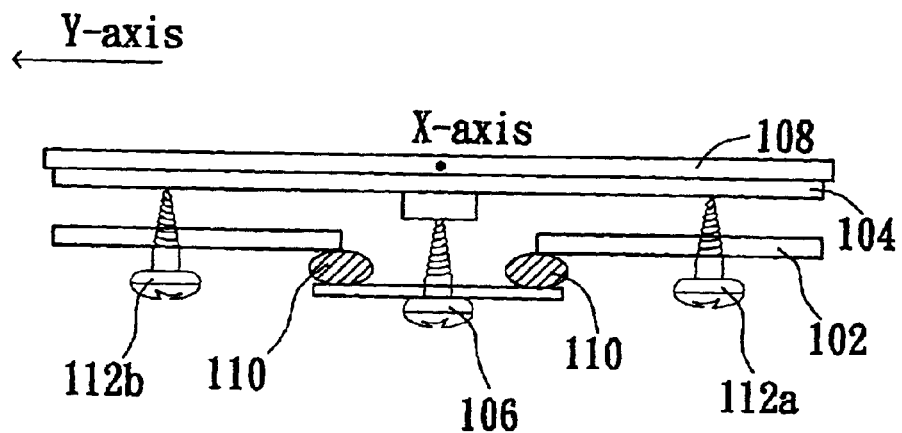
FIG. 1a is a schematic cross-sectional view of a conventional adjusting apparatus of the reflection mirror.
Figure 1B:
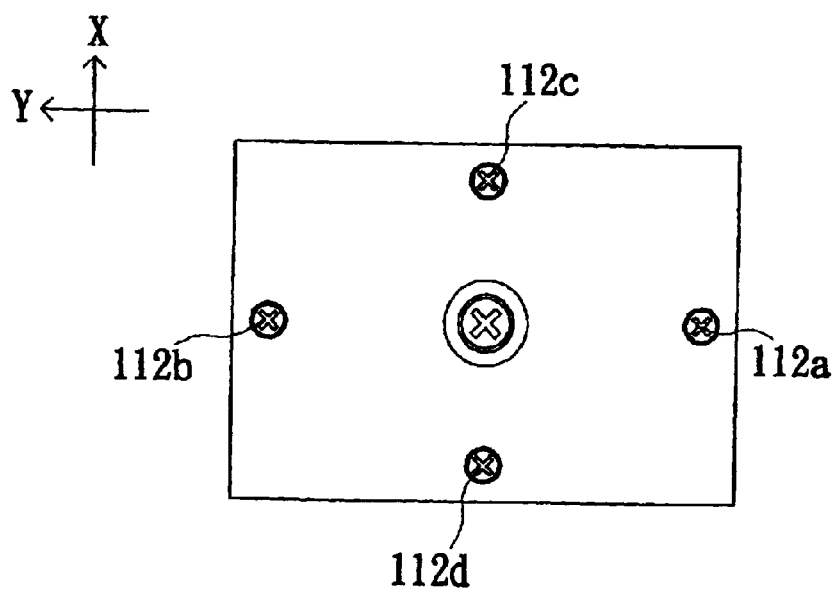
Figure 2:
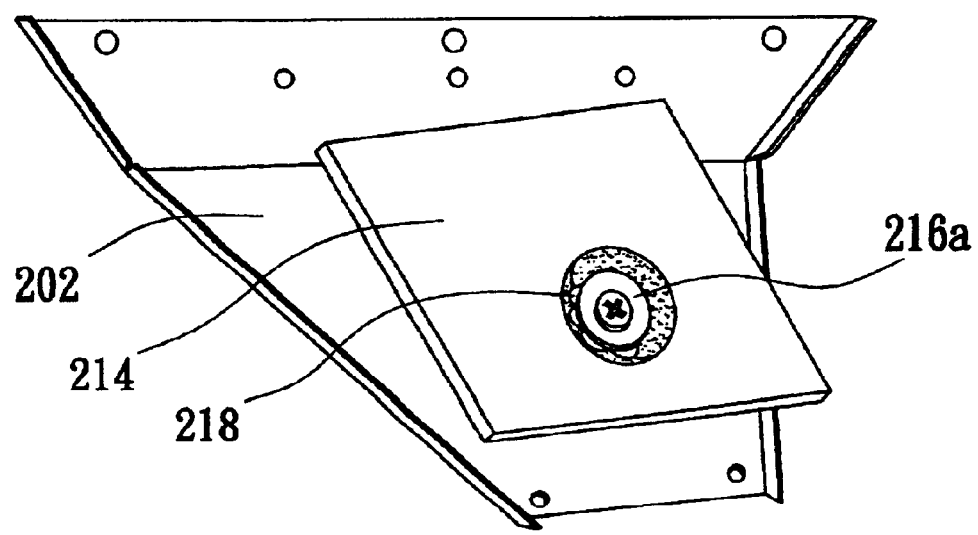
FIG. 2 is a schematic diagram of an adjusting apparatus of the reflection mirror, according to a preferred embodiment of the invention.
Figure 3:
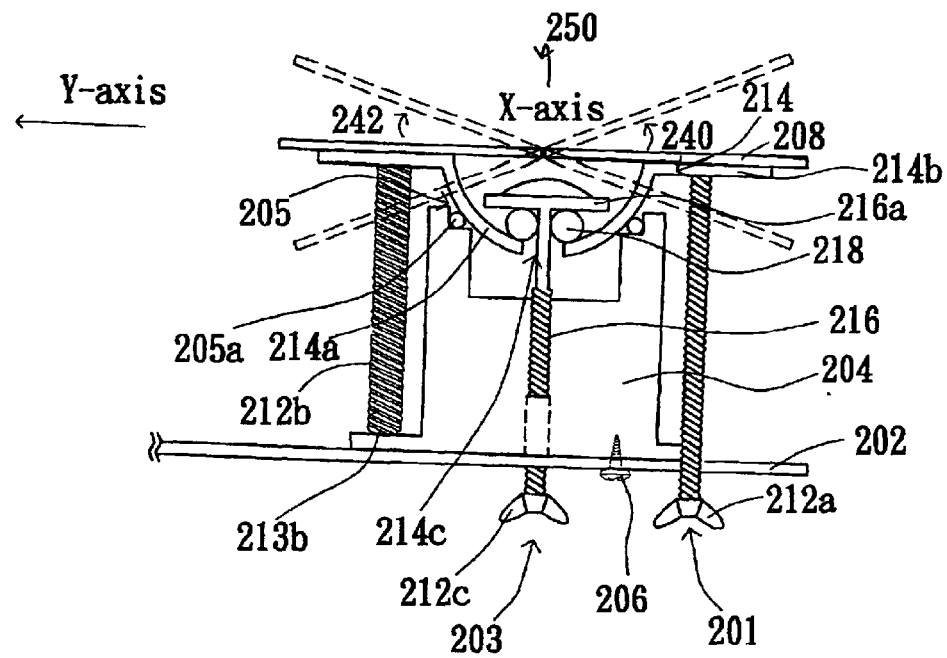
FIG. 3 is a schematic cross-sectional view of the adjusting apparatus of the reflection mirror, according to a preferred embodiment of the invention.

Referring to FIGS. 2 and 3, FIG. 2 is a schematic diagram of an adjusting apparatus of the reflection mirror, and FIG. 3 shows a cross-sectional view of the adjusting apparatus of the reflection mirror, according to a preferred embodiment of the invention. The adjusting apparatus of the reflection mirror in the invention comprises a holding base plate 202, an affixing block 204 affixed on the holding base plate 202, at least one adjusting set, such as a first adjusting set 201, and a rotatable chassis 214 affixed on the affixing block 204.

The first adjusting set 201 comprises an adjusting screw 212a and an elastic adjusting device, such as an adjusting spring 212b. The adjusting screw 212a and the adjusting spring 212b are preferably located opposite to each other. The first adjusting screw 212a is mounted onto the holding base plate 202 and transpierces the holding base plate 202. Moreover, the first adjusting set 201 can further include an affixing screw 213b, wherein the affixing screw transpierces the holding base plate 202. Practically, the adjusting spring 212b is fit in the first affixing screw 213b, so as to maintain the first adjusting spring at a specific location. According to the invention, the adjusting apparatus of reflection mirror can also comprise two or more adjusting sets. For example, the first adjusting set 201 and the second adjusting set 203 can be located perpendicularly to each other. The mechanism of the angle-adjusting apparatus with two adjusting sets is similar to that of the angle-adjusting apparatus with only one adjusting set, except that the second adjusting set 203 is perpendicular to the first adjusting set 201. Similar to the first adjusting set 201, the second adjusting set 203 comprises a second adjusting screw 212c, a second elastic adjusting device, such as a spring (not shown) and a second affixing screw (not shown). Since the function and elements of the second adjusting set are similar to those of the first adjusting set 201, the details are not further described and can be revisited in the above description.

According to the invention, the rotatable chassis 214 of the angle-adjusting apparatus has a reflection mirror 208 affixed thereon. The center of the rotatable chassis 214 has a hemispheric structure 214a, and is coupled to the affixing block 204. The periphery of the hemispheric structure 214a of the rotatable chassis 214 has an extending portion 214b. The first adjusting screw 212a is used to fasten the extending portion 214b of the rotatable chassis 214, and the first adjusting spring 212b is used to support the extending portion 214b of the rotatable chassis 214.

The angle of the rotatable chassis 214, preferably, is adjusted by the first adjusting set 201 and the second adjusting set 203. The reflection mirror 208 has an X-axis and a Y-axis. As shown in FIG. 3, the X-axis is perpendicular to the plane of the drawing page, and the Y-axis is parallel to the plane of drawing page and is perpendicular to the X-axis. The point of intersection is located at the spherical center of the hemispheric structure 214b on the rotatable chassis 214. The operation for adjusting the angle of the reflection mirror 214 comprises adjusting the angles along the X-axis and the Y-axis. When the first adjusting screw 212a rotated into the rotatable chassis 214, the rotatable chassis 214 is rotated along the first direction 240 and compresses the first adjusting spring 212b. When the first adjusting screw 212a is rotated out from the rotatable chassis 214, the rotatable chassis 214 is rotated along the opposite direction to the first direction 240 and expands the first adjusting spring 212b. As a result, by turning the adjusting screw 212a in and out, the reflection mirror can be rotated on the X-axis. Likewise, when the second adjusting screw 212c is rotated into the rotatable chassis 214, the rotatable chassis 214 rotates along the second direction 250 and compresses the second adjusting spring (not shown). When the second adjusting screw 212c is rotated out from the rotatable chassis 214, the rotatable chassis 214 rotates along a direction (not shown) opposite to the second direction 250 and stretches the second adjusting spring. As a result, by screwing the adjusting screw 212c in and out, the reflection mirror can be rotated on the Y-axis. In the angle-adjusting apparatus of reflection mirror of the invention, the intersection point of the X-axis and the Y-axis is located at the spherical center of the hemispheric structure 214a on the rotatable chassis 214. When the rotatable chassis 214 is rotated, it rotates with respect to the spherical center of the hemispheric structure 214a. Thus, when the reflection mirror 208 is adjusted, the location of rotation center does not shift due to the angle adjustment along the X-axis and the Y-axis. Therefore, the invention does not have the problems of a shifting center of rotation that the conventional adjusting apparatus has, which makes precise adjustments difficult and time consuming. Moreover, when the micro adjustment of the angle along the X-axis and the Y-axis is performed in the invention, the precise adjustment can be achieved.

The user can adjust the reflection mirror 208 by simply operating the adjusting screws, in which the associated adjusting spring can expand and contract accordingly without requiring the user to simultaneously operate two adjusting screws. Consequently, the apparatus of the present invention can be easily adjusted, without requiring the level of skill that the conventional apparatus requires.

Furthermore, when the user operates the adjusting screw, the counterpart adjusting spring can automatically expand and contract to adjust the spring length In addition, the invention can effectively prevent the deformation of the reflection mirror 208 associated with the angle-adjustment procedure, because rotatable chassis 214, to which mirror is affixed, is made of a metallic material and because the adjusting screw applies the force on the rotatable chassis 214, and not directly on the reflection mirror 208.

Figure 5:
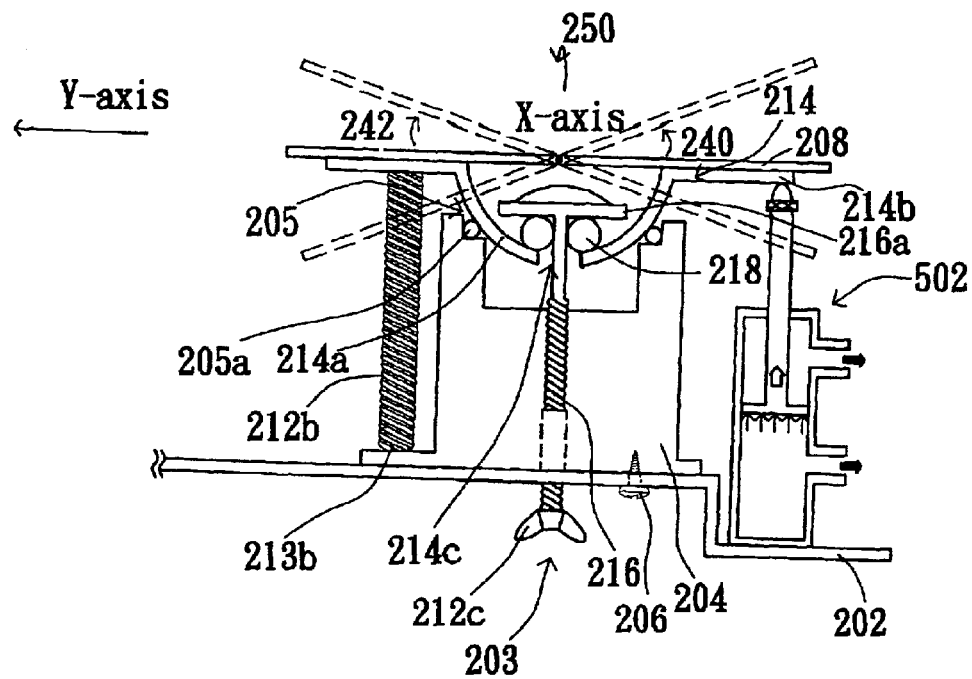
FIG. 5 is a cross-sectional view, schematically illustrating the adjusting apparatus of the reflection mirror, according to a preferred embodiment of the invention.
Figure 6:
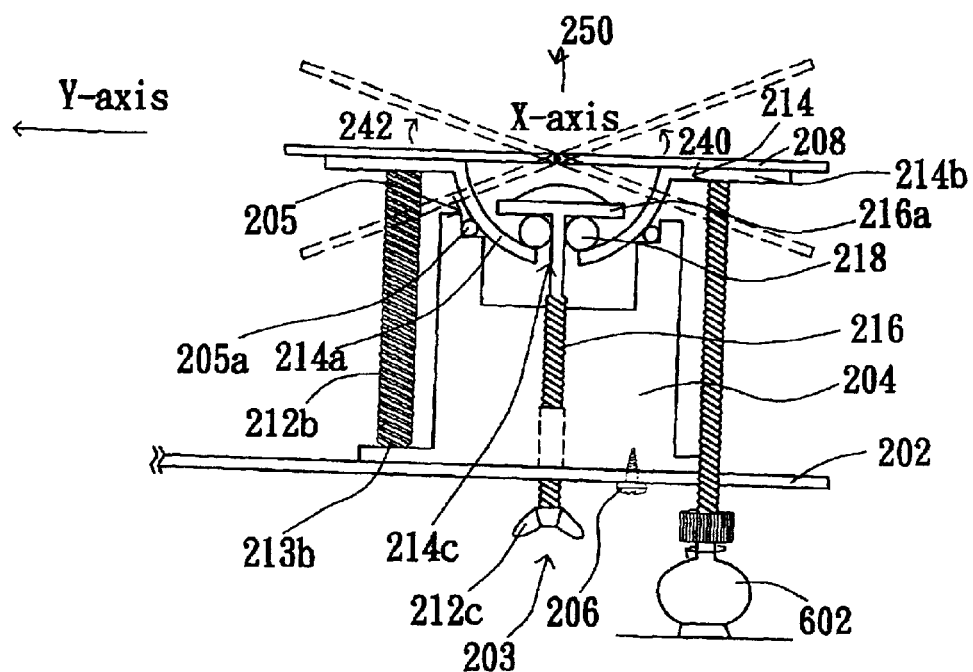
FIG. 6 is a cross-sectional view, schematically illustrating the adjusting apparatus of the reflection mirror, according to a preferred embodiment of the invention.

Furthermore, although the adjusting screw can be operated manually, an automatic control manner can also be applied. For example, as shown in FIG. 5, the air pressure cylinder or oil press cylinder 502 can be applied to replace the adjusting screw for adjusting the rotatable chassis 214. Another example is to use a linear motor or a servomotor 602, as shown in FIG. 6, to rotate the adjusting screw. All these manners of operating the apparatus are still within the scope of the invention.

Furthermore, as shown in FIG. 3, the angle-adjusting apparatus of reflection mirror in the invention has the affixing block 204 located within the space formed by the first screw 212a, the first adjusting spring 212b, the second adjusting screw 212c and the second adjusting spring. The affixing block 204 is locked on the holding base plate 202 by a holding screw 206, which transpierces the holding base plate 202. The number of the holding screws 206 is not a definite number but should be sufficient to hold the affixing block 204. The number of the holding screws 206 is preferably two. There is a recess 205 at the coupling location of the affixing block 204 and the rotatable chassis 214. A rubber O-ring 205a is included in the recess 205, so as to facilitate the rotation of the rotatable chassis 214. The rotatable chassis 214 can be movably locked onto the affixing block 204 through the semi-fixing screws 216, which transpierces the rotatable chassis 214 through a hole 214c. It can also have several rolling steel balls 218 between the rotatable chassis 21 and the screw tip 216a of the semi-fixing screws 216, in order to facilitate the rotation.

Figure 4:
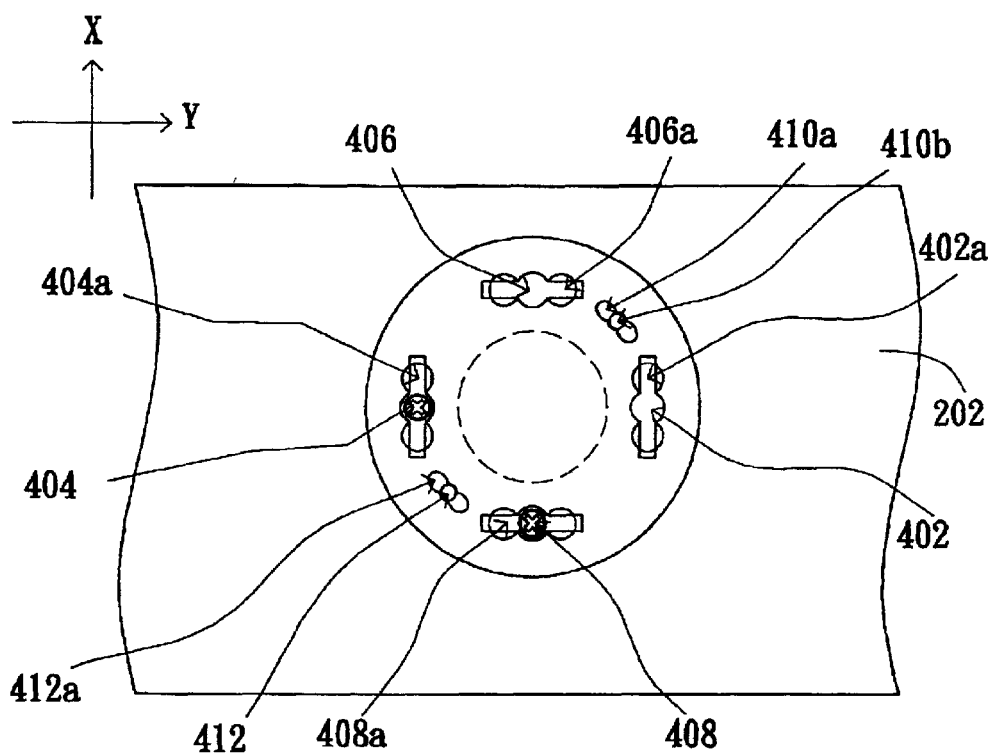
FIG. 4 shows a schematic bottom view of the adjusting apparatus of the reflection mirror, according to a preferred embodiment of the invention.

FIG. 4 is a bottom view, schematically illustrating the holding bas plate 202 of the adjusting apparatus of reflection mirror, according to a preferred embodiment of the invention. The holding base plate 202 has several screw holes, to allow several screws to fit through and being locked thereon. As shown in FIG. 4, the first adjusting screw 212a and the first affixing screw 213b for the adjusting spring of the first adjusting set 201 are locked respectively onto the first adjusting screw holes 402 and the first adjusting spring fixing screw holes 404. The second adjusting screw 212c and the second affixing screws for the adjusting spring of the second adjusting set 203 are locked respectively onto the second adjusting screw holes 406 and the second adjusting spring fixing screw holes 408. It can be clearly seen that the first adjusting set 201 and the second adjusting set 203 are preferably disposed to be perpendicular to each other, whereby the line from the first adjusting screw holes 402 to the first adjusting spring fixing screw holes 404 is perpendicular to the line from the second adjusting screw holes 406 to the second adjusting spring fixing screw holes 408. The holding screw holes 410 and 412 are used to lock the holding screws 206 of the affixing block 204 onto the holding base plate 202.

Moreover, the first adjusting screw holes 402, the first adjusting spring fixing screw holes 404, the second adjusting screw holes 406, the second adjusting spring fixing screw holes 408, and the holding screw holes 410 and 412 can have lateral extending holes, respectively indicated by the lateral extending holes 402a, 404a, 406a, 408a, 410a, and 412a, so as to allow the first adjusting screw 212a, the first affixing screw 213b, the second adjusting screw 212c, the second affixing screw 213b, and the holding screws 206 of the affixing block to be able to move along the lateral extending holes. When the first adjusting screw holes 402, the first adjusting spring fixing screw holes 404, the second adjusting screw holes 406, the second adjusting spring fixing screw holes 408, and the holding screw holes 410 and 412 are shifted and locked into the lateral extending holes, the reflection mirror 208 can rotate a certain angle on the horizontal surface of the reflection mirror 208. Consequently, the reflection mirror 208 can have the effect of horizontal adjustment by a horizontal rotation angle.

Figure 7:
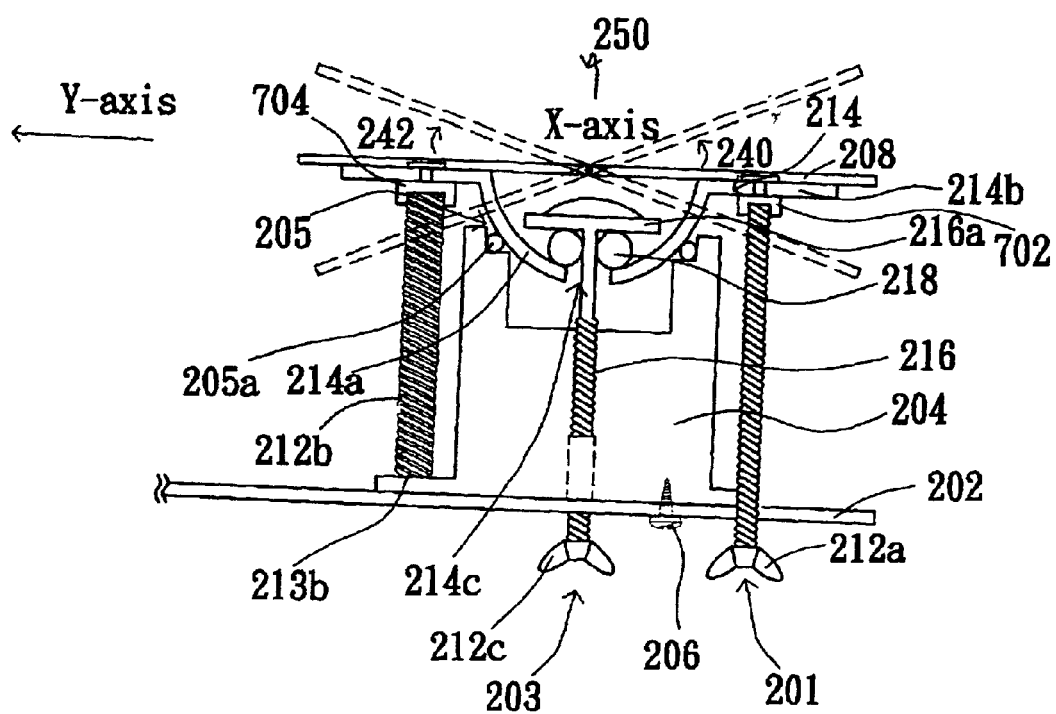
FIG. 7 is a cross-sectional view, schematically illustrating the adjusting apparatus of the reflection mirror, according to a preferred embodiment of the invention.

Further still, as shown in FIG. 7, the first adjusting screw 212a and the second adjusting screw 212c hold the extending portion 214b of the rotatable chassis at the contact points. It can further include a fixing device, such as rivet 702. Similarly, the first adjusting spring 212b and the second adjusting spring hold the extending portion 214b of the rotatable chassis at the contact points and can also include a fixing device, such rivet 704, so as to improve the stability. Through the rivet 702 affixed on the extending portion of the rotatable chassis 214, the adjusting screws and the adjusting springs can be integrated with the rotatable chassis 214 as one structure, which is convenient in use.

In addition, the adjusting apparatus of the reflection mirror is not limited for use in a TV of the rear-projection type. The present invention can be used in various applications that incorporate the mechanism of a reflection mirror.

In summary, the angle-adjusting apparatus of the reflection mirror of the invention has several advantages, as follow:

1. The angle-adjusting apparatus of the invention uses a rotatable chassis to hold the reflection mirror. When the angle adjusting process is performed, the X-axis, the Y-axis, and the rotation center are fixed, allowing the user make micro adjustments and to obtain high image quality with easy operation.

2. The use of a rotatable chassis to hold the reflection mirror and a combination of the adjusting screw and adjusting spring prevents the deformation of the reflection mirror and maintains the image quality during the angle-adjustment procedure.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. An angle-adjusting apparatus of a reflection mirror, comprising:

a holding base plate;

an affixing block, mounted on the holding base plate;

a rotatable chassis, on which a reflection mirror is affixed, wherein the rotatable chassis has a hemispheric structure located at a center portion of the rotatable chassis and coupled to the affixing block, and the hemispheric structure has an extending portion at a periphery region, the extending portion extending along the reflection mirror; and a first adjusting set, comprising a first adjusting screw and a first elastic adjusting device, wherein the first adjusting screw is affixed onto the holding base plate and transpierces the holding base plate to hold the rotatable chassis at the extending portion, and the first elastic adjusting device holds the rotatable chassis at the extending portion opposite to the first adjusting screw, the angle-adjusting apparatus of a reflection mirror further comprising a first affixing screw for the first adjusting screw, locked onto the holding base plate, the first elastic adjusting device being fit in the first affixing screw for the first adjusting screw;

wherein when the first adjusting screw is rotated in, the rotatable chassis rotates along a first direction and compresses the first elastic adjusting device, and when the first adjusting screw is rotated out, the rotatable chassis rotates along a direction opposite to the first direction and expands the first elastic adjusting device.

2. The angle-adjusting apparatus of a reflection mirror of claim 1, wherein the holding base plate has a first affixing screw hole for the first adjusting screw, to allow the first affixing screw for the first adjusting screw to transpierce, wherein the first affixing screw hole for the first adjusting screw has a lateral extending hole, so as to allow the first affixing screw for the first adjusting screw to move along the lateral extending hole.

3. An angle-adjusting apparatus of a reflection mirror, comprising:

a holding base plate;

an affixing block, mounted on the holding base plate;

a rotatable chassis, on which a reflection mirror is affixed, wherein the rotatable chassis has a hemispheric structure located at a center portion of the rotatable chassis and coupled to the affixing block, and the hemispheric structure has an extending portion at a periphery region;

a first adjusting set, comprising a first adjusting screw and a first elastic adjusting device, wherein the first adjusting screw is affixed onto the holding base plate and transpierces the holding base plate to hold the rotatable chassis at the extending portion, and the first elastic adjusting device holds the rotatable chassis at the extending portion opposite to the adjusting screw; and a second adjusting set situated perpendicularly to the first adjusting set, wherein the second adjusting set comprises a second adjusting screw and a second elastic adjusting device, wherein the second adjusting screw is affixed onto the holding base plate and transpierces the holding base plate to hold the rotatable chassis at the extending portion, and the second elastic adjusting device holds the rotatable chassis at the extending portion opposite to the second adjusting screw, the angle-adjusting apparatus of a reflection mirror further comprising a first affixing screw and a second affixing screw, respectively transpiercing the centers of the first elastic adjusting device and the second elastic adjusting device, wherein when the first adjusting screw is rotated in, the rotatable chassis rotates along a first direction and compresses the first elastic adjusting device; when the first adjusting screw is rotated out, the rotatable chassis rotates along a direction opposite to the first direction and stretches the first elastic adjusting device; when the second adjusting screw is rotated in, the rotatable chassis rotates along a second direction and compresses the second elastic adjusting device; and when the second adjusting screw is rotated out, the rotatable chassis rotates along a direction opposite to the second direction and stretches the second elastic adjusting device.

4. The angle-adjusting apparatus of a reflection mirror of claim 3, wherein the holding base plate has a first affixing screw hole for the first adjusting screw and a second affixing screw hole for the second adjusting screw, which the first affixing screw for the first adjusting screw and the second affixing screw for the second adjusting screw respectively transpierce, wherein the first affixing screw hole for the first adjusting screw and the second affixing screw hole for the second adjusting screw respectively have a lateral extending hole, so as to allow the first affixing screw for the first adjusting screw and the second affixing screw hole for the second adjusting screw to move along the respective lateral extending holes.

5. An angle-adjusting apparatus of a reflection mirror, comprising:

a holding base plate;

an affixing block, mounted on the holding base plate;

a rotatable chassis, on which a reflection mirror is affixed, wherein the rotatable chassis has a hemispheric structure located at a center portion of the rotatable chassis and coupled to the affixing block, and the hemispheric structure has an extending portion at a periphery region, the extending portion extending along the reflection mirror;

a first adjusting set, comprising a first adjusting screw and a first elastic adjusting device, wherein the first adjusting screw is affixed onto the holding base plate and transpierces the holding base plate to hold the rotatable chassis at the extending portion, and the first elastic adjusting device holds the rotatable chassis at the extending portion opposite to the first adjusting screw; and a first affixing screw transpiercing the first elastic adjusting device to lock the first elastic adjusting device onto the holding base plate, wherein when the first adjusting screw is rotated in, the rotatable chassis rotates along a first direction and compresses the first elastic adjusting device, and when the first adjusting screw is rotated out, the rotatable chassis rotates along a direction opposite to the first direction and expands the first elastic adjusting device.

6. The angle-adjusting apparatus of a reflection mirror of claim 5, wherein the holding base plate has a first affixing screw hole to allow the first affixing screw to transpierce, wherein the first affixing screw hole has a lateral extending hole, so as to allow the first affixing screw to move along the lateral extending hole.

7. An angle-adjusting apparatus of a reflection mirror, comprising:

a holding base plate;

an affixing block, mounted on the holding base plate;

a rotatable chassis, on which a reflection mirror is affixed, wherein the rotatable chassis has a hemispheric structure located at a center portion of the rotatable chassis and coupled to the affixing block, and the hemispheric structure has an extending portion at a periphery region;

a first adjusting set, comprising a first adjusting screw and a first elastic adjusting device, wherein the first adjusting screw is affixed onto the holding base plate and transpierces the holding base plate to hold the rotatable chassis at the extending portion, and the first elastic adjusting device holds the rotatable chassis at the extending portion opposite to the adjusting screw;

a second adjusting set situated perpendicularly to the first adjusting set, wherein the second adjusting set comprises a second adjusting screw and a second elastic adjusting device, wherein the second adjusting screw is affixed onto the holding base plate and transpierces the holding base plate to hold the rotatable chassis at the extending portion, and the second elastic adjusting device holds the rotatable chassis at the extending portion opposite to the second adjusting screw; and a first affixing screw and a second affixing screw, respectively transpiercing the first elastic adjusting device and the second elastic adjusting device, wherein when the first adjusting screw is rotated in, the rotatable chassis rotates along a first direction and compresses the first elastic adjusting device; when the first adjusting screw is rotated out, the rotatable chassis rotates along a direction opposite to the first direction and stretches the first elastic adjusting device; when the second adjusting screw is rotated in, the rotatable chassis rotates along a second direction and compresses the second elastic adjusting device; and when the second adjusting screw is rotated out, the rotatable chassis rotates along a direction opposite to the second direction and stretches the second elastic adjusting device.

8. The angle-adjusting apparatus of a reflection mirror of claim 9, wherein the holding base plate has a first affixing screw hole and a second affixing screw hole to respectively allow the first affixing screw and the second affixing screw to transpierce, wherein the first affixing screw hole and the second affixing screw hole respectively have a lateral extending hole, so as to allow the first affixing screw and the second affixing screw to move along the lateral extending hole.

* * * * *